(12) United States Patent  (10) Patent No.: US 7,748,263 B2
Pruckner  (45) Date of Patent: Jul. 6, 2010

(54) SPRING SYSTEM FOR A VEHICLE WHEEL SUSPENSION SYSTEM

(75) Inventor: Alfred Pruckner, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 12/209,963

(22) Filed: Sep. 12, 2008

(65) Prior Publication Data

US 2009/0000368 A1    Jan. 1, 2009

Related U.S. Application Data

(63) Continuation of application No. PCT/EP2007/001100, filed on Feb. 9, 2007.

(30) Foreign Application Priority Data

Mar. 15, 2006    (DE) ....................... 10 2006 011 856

(51) Int. Cl.
G01M 17/04 (2006.01)
(52) U.S. Cl. .................................. 73/117.03; 73/11.07
(58) Field of Classification Search .............. 73/117.03, 73/11.04, 11.07, 11.08, 11.09, 115.01, 117.01, 73/117.02
See application file for complete search history.

(56) References Cited

U.S. PATENT DOCUMENTS

| 2,301,742 | A | 11/1942 | Mueller |
| 3,966,223 | A | 6/1976 | Carr |
| 5,074,582 | A | 12/1991 | Parsons |

FOREIGN PATENT DOCUMENTS

| DE | 33 23 026 A1 | 1/1985 |
| DE | 41 04 904 A1 | 8/1992 |
| DE | 197 02 241 A1 | 2/1998 |
| DE | 199 35 865 A1 | 2/2001 |
| DE | 102 37 439 A1 | 3/2003 |

(Continued)

OTHER PUBLICATIONS

German Search Report dated Sep. 20, 2006 including English translation of the relevant portion (Nine (9) pages), 10 2006 011 856.1.
European Search Report dated May 11, 2007 including English translation of the relevant portion (Six (6) pages), EP 07 00 2792.

(Continued)

*Primary Examiner*—Eric S McCall
(74) *Attorney, Agent, or Firm*—Crowell & Moring LLP

(57) ABSTRACT

A vehicle wheel suspension system is provided, having a first spring element clamped between the vehicle body and a wheel and a second spring element clamped between the body and the wheel in parallel to the first spring element by application of a tensile force by a tensioning element. The second spring element is not active without application of the tensile force. A pressure addition spring element is also provided which, in the case of large spring excursions, acts as an end stop. The pressure addition spring element is not activated by of the tensile force for activating the second spring element. The spring rate of the second spring element is preferably lower than that of the first spring element. Additional spring elements of different wheels or axles can be activated by a common mechanical tensioning element which can shorten or lengthen several tension devices connected with the spring elements.

9 Claims, 3 Drawing Sheets

FOREIGN PATENT DOCUMENTS

| | | | |
|---|---|---|---|
| DE | 10 2004 013 559 | A1 | 10/2005 |
| DE | 10 2004 013 559 | B4 | 10/2006 |
| EP | 0 407 075 | A2 | 1/1991 |
| EP | 1 403 104 | A2 | 3/2004 |
| EP | 1 577 125 | A2 | 9/2005 |

OTHER PUBLICATIONS

International Search Report dated May 7, 2007 including English translation (Six (6) pages), PCT/EP2007/001100.

German and English versions of German Opposition dated Jun. 15, 2009.

German Opposition dated Jun. 15, 2009 including English translation (Eight (8) pages).

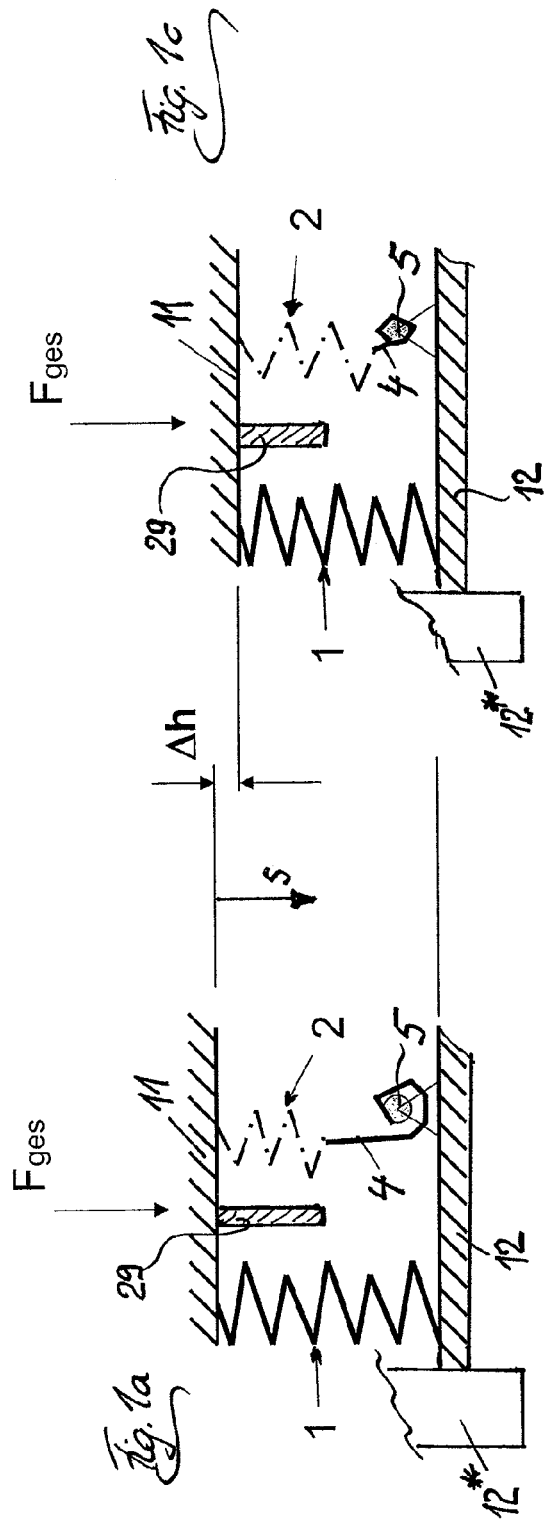
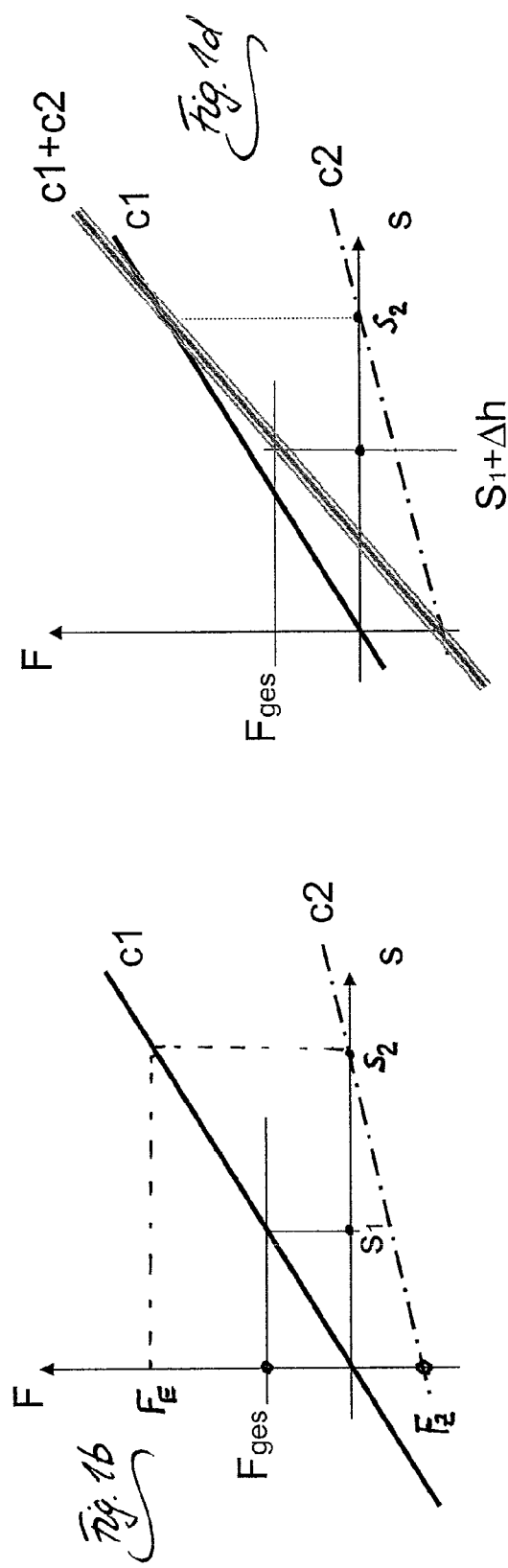

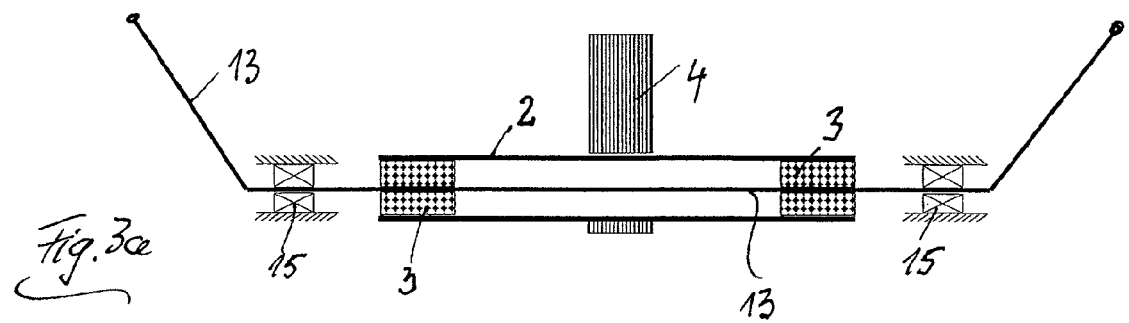
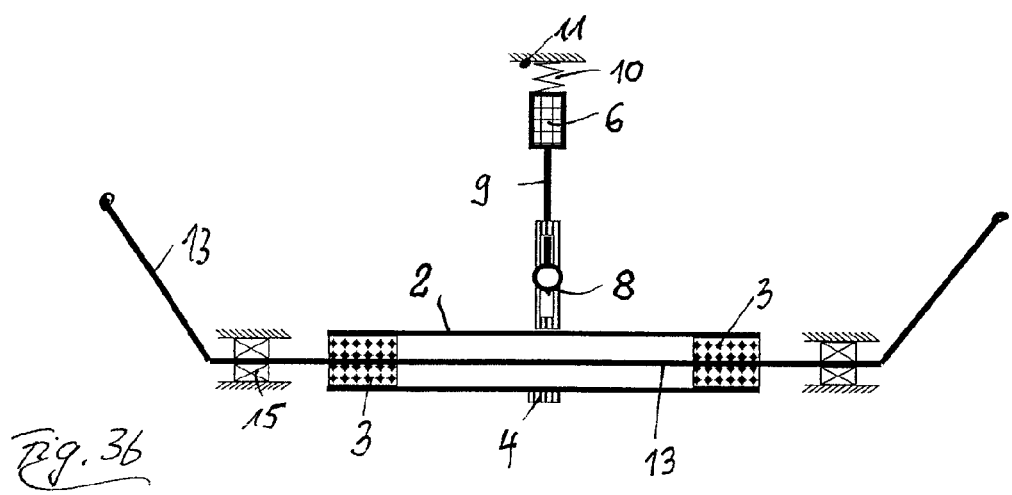
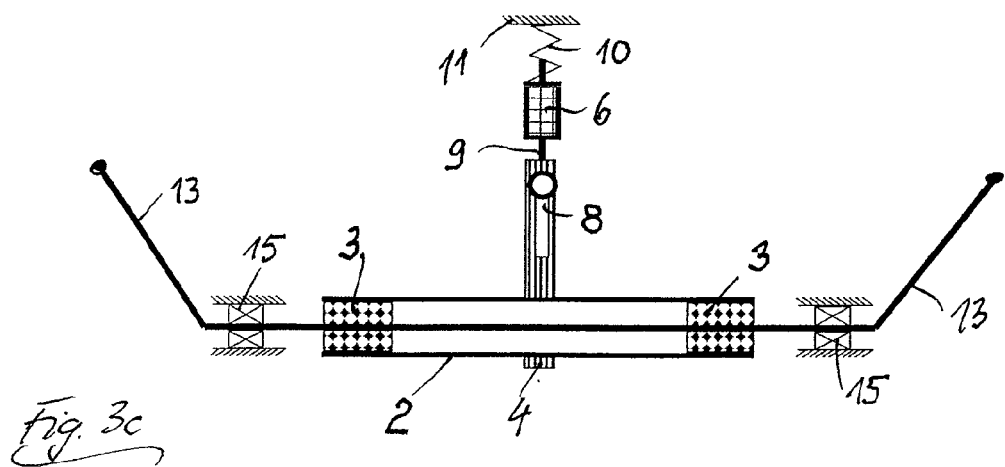

SPRING SYSTEM FOR A VEHICLE WHEEL SUSPENSION SYSTEM

CROSS-REFERENCE TO RELATED APPLICATIONS

This application is a continuation of PCT International Application No. PCT/EP2007/001100, filed on Feb. 9, 2007, which claims priority under 35 U.S.C. §119 to German Application No. 10 2006 011 856.1, filed Mar. 15, 2006, the entire disclosures of which are expressly incorporated by reference herein.

BACKGROUND AND SUMMARY OF THE INVENTION

The invention relates to a suspension system for a vehicle wheel suspension having a first spring element in the end clamped between the vehicle body and a vehicle wheel and a second or additional spring element which in the end can be clamped between the vehicle body and the vehicle wheel by the introduction of a force or of a momentum by a mechanical tensioning element, which spring element can thereby be connected parallel to the first spring element, while this additional spring element is not active without force or momentum introduced into the system, and furthermore having a pressure addition spring element which, in the case of large spring excursions of the first spring element, by way of an end stop, becomes active or is connected. In addition to German Patent Document DE 10 2004 013 559 B4, reference is made to German Patent Document DE 41 04 904 A1 as well as German Patent Document DE 33 23 026 A1 with respect to the known state of the art.

Chassis of motor vehicles can be designed according to different philosophies. Comfortably designed chassis of passenger cars are relatively soft; chassis of a sportier design are relatively hard. In addition to the different philosophy of the individual manufacturers of automobiles or passenger cars, in the case of some vehicles, a "sporty chassis" may be chosen as optional equipment. In order to design this selection in the respective vehicle in a variable fashion, some manufacturers offer so-called adjusting shock absorbers by which the driver can choose between a comfortable and a sporty shock absorber coordination. Although this different shock absorber adjustment has a subjective influence on the driver's feelings, objectively no improvement can be achieved with respective to a sportier vehicle handling when the damping is hard. An adjusting possibility of the spring rate(s) would be more favorable here.

The latter is basically known for vehicles; compare, for example, the second document mentioned above which, however, shows a relatively high-expenditure controllable suspension system for wheel suspension on motor vehicles. In contrast, a variable suspension system for a motor vehicle having at least one main spring element and at least one shock absorber described in the initially first-mentioned German Patent Document DE 10 2004 013 559 B4 is simpler. The main spring element consists of a bearing spring and as usual of a pressure addition spring as well as a tension stop spring. In addition, a second spring element is provided which counteracts or can counteract the main spring element and can be optionally activated for this purpose by way of an adjusting system, the engaged second spring element causing a spring rate intensification by a premature intervention of the pressure addition spring present in the compression direction and a lowering of the motor vehicle. According to this known state of the art, the pressure addition spring therefore always has to be in an engagement when an increased spring rate is desired. Since, however, a pressure addition spring is also used as an end stop for limiting the spring excursion of the bearing spring, the spring rate of the pressure addition spring is relatively high; that is, the amount of its spring rate is relatively large and this pressure addition spring is therefore relatively hard. However, if this pressure addition spring is always engaged when the vehicle is lowered, the chassis will be extremely hard and therefore uncomfortable.

By the present invention, a similar suspension system (as the one known from German Patent Document DE 10 2004 013 559 B4) now is to be indicated by which, however, a softer and therefore more comfortable chassis can be presented (=object of the invention). For a suspension system of a vehicle wheel suspension having a first spring element between the vehicle body and wheel and a second spring element, the solution of this task is characterized in that the introduction of the force or the momentum for activating the second or additional spring element does not activate the pressure addition spring element.

In principle, it is known that, when two or more spring elements act in parallel between two components, the effective total spring rate is composed of the sum of the partial spring rates. By connecting one or more additional spring elements to a first spring element, the effective total spring rate can therefore be varied. In a chassis or a wheel suspension of a vehicle, a second or additional spring element can therefore be connected in parallel to the usual bearing spring here called the first spring element—, in order to vary the hardness of the chassis. This is basically known and thus also implemented in the above-mentioned known state of the art. In the above-mentioned state of the art according to German Patent Document DE 10 2004 013 559 B4, the connectable second and additional spring element is the so-called pressure addition spring of that document which, in FIGS. 1a, 1b of that above-mentioned document, has the reference number 16, in connection with the second spring element counteracting the so-called bearing spring of that document which, in FIGS. 1a, 1b of that above-mentioned document, has the reference number 18.

However, with the present invention, it was recognized that it is not required to engage the pressure addition spring according to German Patent Document DE 10 2004 013 559 B4, which in the present invention is called as pressure addition spring element. On the contrary, for changing the spring rate, it is sufficient for only a second or additional spring element, which also exists in the above-mentioned German Patent Document DE 10 2004 013 559 B4, to be connected, that is, in the end, to be clamped between the vehicle wheel and the vehicle body, between which a first spring element constructed as a pressure spring is already clamped as the so-called bearing spring. In this case, the second spring element by no means has to act as a pressure spring but the second spring element can definitely also act as a tension spring which, by a mechanical tension device, is clamped between the vehicle wheel and the vehicle body.

Other objects, advantages and novel features of the present invention will become apparent from the following detailed description of one or more preferred embodiments when considered in conjunction with the accompanying drawings.

BRIEF DESCRIPTION OF THE DRAWINGS

FIGS. 1a-1d schematically illustrate the arrangements and response characteristics of an embodiment of the present invention.

FIGS. 2a-2c and 3a-3c illustrate alternative embodiments of the present invention.

DETAILED DESCRIPTION

Figure 2A:
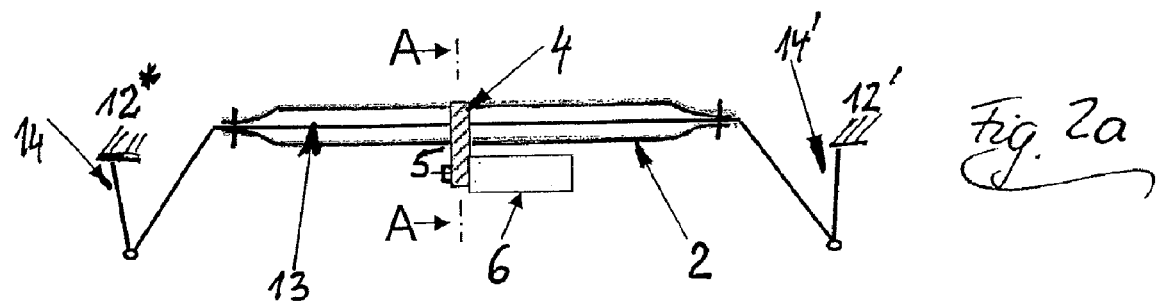

FIG. 1a shows a first spring element 1 which is always clamped in between two only abstractly illustrated components, which concretely are or may be a lower control arm 12 guiding the wheel 12* (more precisely, its wheel carrier) of a double-track vehicle (which control arm is known to a person skilled in the art), and the body 11 of the vehicle, which first spring element 1 is constructed as a coil pressure spring and acts as a bearing spring for the body 11 with respect to the wheel 12* and thereby in the end is clamped between the body 11 and the wheel 12*. In addition to this first spring element 1, a second spring element 2 can be clamped between these components; that is, between the control arm 12 (or, in the end, the wheel 12*) and the body 11 by means of a mechanical tension device, which in this case consists of a flexible tension device 4, which can be wound onto a reel 5 or unwound from the latter. For this purpose, the reel 5 is fastened to one of the two components; here, for example, to the control arm 12, whereas the free end of the tension device 4 fastened with its other end on the reel 5 and further windable upon this reel 5 is connected with the first end of the second spring element 2 which is fastened with its other end to the other one of the two components; specifically here to the body 11.

In the condition according to FIG. 1a, the flexible tension device 4 is so far unwound from the reel 5 that the tension device 4 hangs slack between the reel 5 and the second spring element 2, so that the latter is therefore not clamped between the two components 11, 12, that is, between the body 11 and the control arm 12. In contrast, in the condition according to FIG. 1c, the flexible tension device 4 is wound so far onto the reel 5 that the second spring element 2—here also constructed as a coil spring—acting as a tension spring, is clamped between the body 11 and the control arm 12.

Furthermore, in FIGS. 1a, 1c, a pressure addition spring element 29 is illustrated which is known to the person skilled in the art and is used only in the case of relatively large spring excursions of the bearing spring, that is, of the first spring element 1. This pressure addition spring element 29 is preferably fastened to the vehicle body 11. When the wheel 12* compresses so far with respect to the vehicle body that here the control arm 12—in reality, however, a component part which is connected with the control arm and is part of a shock absorber which is not shown and is connected parallel to the first spring element 1—comes to rest on the pressure addition spring element 29, also this pressure addition spring element 29 is activated. However, specifically, the pressure addition spring element 29 is active neither in the condition according to FIG. 1a, nor in the condition according to FIG. 1c, which both represent the non-operative state of the vehicle, or a condition in which the body 11 has not excessively compressed or rebound with respect to the wheel 12*; that is, in which no extremely large spring excursion of the first spring element 1 takes place. With the exception of large spring excursions of the first spring element 1, the pressure addition spring element 29 is specifically not operative neither when the second spring element is not clamped in between the body 11 and the wheel 12*, nor when it is clamped in.

The above-mentioned reel 5 can be caused to rotate by means of a servo motor not shown here in one or in the other rotating direction in order to keep the free end of the tension device 4 (this is the section situated between the spring element 2 and the reel 5) limp or slack, as illustrated in FIG. 1a, or tensioned or tight, as illustrated in FIG. 1c. In this case, the design is preferably such that, in the condition according to FIG. 1a, the second spring element 2 is always non-operative, that is, remains without any effect, specifically not only when the first spring element 1 is further compressed and thus the vehicle body 11 is moved toward the wheel 12*, but also when the wheel 12* moves farther away from the body 11.

In contrast, in the condition according to FIG. 1c, it is assumed that the second spring element 2 is preferably tensioned so far by the tensioned tension device 4 that, even in the case of a further movement of the vehicle body 11 toward the wheel 12*, and thus, in the case of a further compressing of the first spring element 1, not only the first tension device 4 but also the second spring element 2 always remains tensioned and thus is and remains fully effective in addition to the first spring element 1. In addition, in this condition according to FIG. 1c, as indicated by the height comparison (Δh), the vehicle body 11 is lowered with respect to the wheel 12 (or therefore also toward the road), specifically by a corresponding shortening of the free end of the tension device 4. The distance between the components 11, 12 to be cushioned can therefore be changed by the tensioning of the tension device 4. It should be pointed out that, although winding-up or unwinding the tension device is mentioned here, this may also be implemented or understood in a generalized sense of a different type of shortening or lengthening the tension device 4.

As mentioned above, although the pressure addition spring element 29 does not become active, in the condition according to FIG. 1c, a harder chassis is present than in the condition according to FIG. 1a because, in the condition according to FIG. 1c, the second spring element 2 is active, which is directed against the first spring element 1 acting as a pressure spring, and which second spring element 2 therefore acts as a tension spring. Specifically, despite the direction of the force of the second spring element 2 acting against the first spring element 1, in the condition according to FIG. 1c, a higher spring rate of the active suspension system, which is formed by the first spring element 1 and the second spring element 2 connected parallel thereto, occurs than in the condition according to FIG. 1a in which the active suspension system is formed only by the first spring element 1. This will be explained in the following by means of FIGS. 1b, 1d.

In FIGS. 1b, 1d, the courses of the spring forces F are illustrated over the respective spring excursion s for the individual relevant spring rates. In FIGS. 1a, 1c, the spring excursion s extends in the vertical direction from the body 11 toward the control arm 12; that is, in the direction of the total force $F_{total}$ also indicated in these FIGS. 1a, 1c, which is transmitted from the body 11 by way of the respectively active spring elements (in the condition according to FIG. 1a, only by way of the first spring element 1 and, in the condition according to FIG. 1c, by way of the first spring element 1 as well as by way of the second spring element 2) to the control arm 12. In this case, "c1" marks the force-path course for the first spring element 1 alone which has the spring rate c1, and analogously, "c2" marks the force-path course for the second spring element 2 alone which has the spring rate c2. Furthermore, FIG. 1d illustrates the force-path course of the suspension system which is active in the condition according to FIG. 1c and which is formed by the first spring element 1 and the second spring element 2 switched parallel thereto and is characterized as "(c1+c2)" since the spring rate of this suspension system is formed by the sum of spring rates c1 and c2 of the first spring element 1 and of the second spring element 2, as will be explained in detail in the following.

The force-path diagram of FIG. 1b is assigned to the condition according to FIG. 1a, specifically only the first spring element 1 being active since, in this condition, the second spring element 2 is not clamped in because, as explained above, the tension device 4 is held in a slack manner. In the origin of the coordinates (spring excursion s=0), the force-path course "c1" of the first spring element 1 indicates the force F=0; that is, here this first spring element 1 operating as a pressure spring in the wheel suspension is completely relaxed. However, in the idle condition of the vehicle, the force $F_{total}$ acts from the body 11 upon this spring element 1, so that the latter is compressed by the distance $s_1$, in which case, the positive force $F_{total}$ is introduced by the first spring element 1.

If the vehicle body 11 were supported differently than by way of the first spring element, its spring excursion s would assume the value "0". If in this (fictitious) condition with the spring excursion s=0, the second spring element 2 acting as a tension spring were tensioned, this would exercise a negative tensile force $F_Z$, which forms the intersection of the force-path course "c2" of the second spring element 2 with the ordinate in FIG. 1b. For a complete relaxation of the second spring element 2, which occurs at its spring excursion $s_2$ and corresponds to the point of intersection of the force-path course "c2" with the abscissa, in the first spring element, the relatively large force $F_E$ would have to act; that is, from the body 11, this relative large force $F_E$ (instead of the force $F_{total}$) would have to act upon the first spring element 1 and upon the second spring element 2. However, it should be explicitly mentioned again that, in the condition according to FIG. 1a, only the characteristic force-path curve "c1" in the diagram according to FIG. 1b is relevant because the second spring element 2 is not activated in this condition.

In addition, the fact that the second spring element 2 acting as the tension spring generates a higher spring rate (c1+c2) in the suspension system formed by the first spring element 1 acting as a pressure spring and by the second spring element 2 than when the first spring element acts alone, can also be explained by a weight removal from the body 11; that is, with a reduction of the force $F_{total}$ exercised by the body 11. The first spring element 1 acting as a pressure spring, which is relieved by such a "weight removal", rebounds corresponding to its spring rate c1 when it acts alone. If additionally, as in this case, a second spring element 2 acting as a tension spring is active, the first spring element 1 naturally rebounds to a lesser extent; that is, the spring rate of the suspension system formed by the two spring elements 1 and 2 has risen.

A suspension system according to the invention that permits such a so-called spring rate switching corresponding to FIGS. 1a, 1c can now be used particularly effectively in the chassis of a vehicle, that is, in its wheel suspension when the spring rate c2 of the second spring element 2 is lower in its amount than the spring rate c1 of the first spring element 1. Otherwise, when the second spring element 2 is connected, such a large distance Δh would ensue by which the vehicle body 11 is lowered in comparison to the condition in which only the first spring element 1 is active that, in the case of the smallest additional compression travel s of the first spring element 1 and of the second spring element 2, for example, as a result of driving over uneven ground sections, the above-mentioned pressure addition element would virtually immediately become engaged. However, as explained above, this would result in an extremely hard and therefore uncomfortable chassis and is therefore undesirable.

The design of the spring rates and particularly of the spring rate c2 of the second spring element 2 is preferably such that, within the scope of the conceivable compression travel of the first spring element 1 to the connection of the pressure addition spring element 29, no relieving of the second spring element 2 takes place because otherwise an unsteady and thereby undesirable force-path course would occur. In other words, the spring rate c2 of the second spring element 2 is selected such that, when the body 11 is compressed with respect to the wheel 12*, the active second spring element 2 remains active at least until the pressure addition spring element 29 is active.

Although so far only a second spring element 2 has been mentioned, which can be connected parallel to a first spring element 1 acting as a bearing spring in a vehicle wheel suspension, in addition to this second spring element 2, another spring element may be provided which is or can be connected in a comparable manner. For example, in accordance with an advantageous further development of the invention, the tension device 4 itself may have an elastic design and thereby act as another additional spring element, a series connection then occurring of the second spring element 2 and the additional spring element formed by the tension device 4, in which case, this series connection of the second spring element 2 and the tension device 4 is, in turn, as described above, connected parallel to the first spring element 1, that is, the bearing spring.

Summarizing the above, it is therefore first suggested that an (operating) condition can be adjusted in a defined manner in that only the first spring element 1, specifically the bearing spring alone and not the second spring element 2 or additional spring element that can be connected parallel thereto becomes active. As a result, an activating of the connectable second or additional spring element 2 is particularly noticeable by its effect. Furthermore, for the connecting of the second or additional spring element 2, the use of a general mechanical tensioning element is suggested because the latter can be designed to be simple while it operates reliably. Such a mechanical tensioning element becomes particularly advantageous as a result of the possibility of lowering the vehicle body 11 by this mechanical tensioning element or alternatively being able to raise it if second or additional spring elements (2) are provided between the vehicle body 11 and the wheels 12* of the vehicle. Together with a connecting of the second or additional spring element 2 and thereby a harder adjusting of the chassis, a lowering of the vehicle body 11 can preferably take place, which is desirable for a sporty driving operation. However, a lowering of the vehicle body 11 can also only take place for simplifying the loading or entering, a change of the suspension characteristics not absolutely being required for this purpose.

Deviating from the first embodiment described by means of FIGS. 1a, 1c, the first spring element 1 and/or the second or additional spring element 2 may be constructed as a torsional spring element, for example, as a torsion bar spring. A preferred embodiment with a second spring element 2 constructed as a torsion bar spring is described by means of FIGS. 2a-2c, where FIG. 2a is a very simplified top view of such an arrangement, while FIGS. 2b, 2c each show the section A-A from FIG. 2a in different conditions.

With respect to FIG. 2a, reference number 13 marks a stabilizer bar, as conventionally (also) constructed as a torsion bar spring which, in a known and usual fashion, is clamped between the two wheels of a vehicle axle, specifically by way of hinged supports 14, 14' linked to its bent free end sections. Each hinged support is appropriately supported at the assigned wheel 12* and 12' respectively (left and right wheel respectively), more precisely, at its wheel carrier. By means of its section extending in a straight line between the two end sections bent with respect to the latter, the stabilizer bar 13 is rotatably disposed in not shown bearings in a usual manner on the or opposite the vehicle body (11), which is not shown in this figure. The usual bearing springs between the vehicle body (11) and the vehicle wheels 12*, 12' constructed, for example, as coil pressure springs, which in each case form a so-called first spring element (1) in accordance with the present invention, are also not shown in the figures.

However, a second spring element 2 for the left vehicle wheel 12* or its first spring element as well as for the right vehicle wheel 12' or its first spring element are illustrated in the figures. Here, this second spring element 2 is constructed as a tube-shaped torsion bar spring (also reference number 2) and is arranged such that it surrounds the stabilizer bar 13 in its section extending in a straight line between the bent-away end sections. This second spring element 2 (like the stabilizer bar 13) therefore extends in the transverse direction of the vehicle between the two wheels 12*, 12' but at a distance therefrom, this tube-shaped torsion bar spring 2 being fastened to the stabilizer bar 13 with both its ends.

Figure 2B:
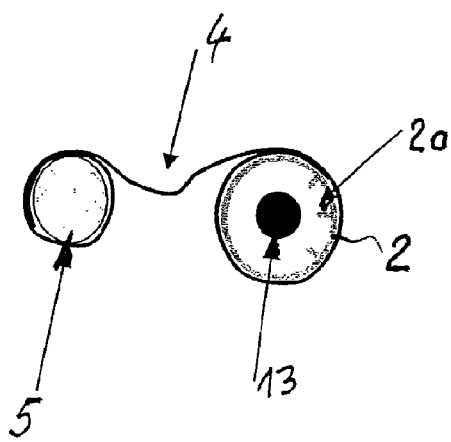

Viewed in the longitudinal direction of this tube-shaped torsion bar spring 2, that is, in the transverse direction of the vehicle, a tension device 4 is mounted in the center on this second spring element 2, that is, in the center of the tube-shaped torsion bar spring 2, on its tube wall on the outside, which tension device 4 extends perpendicular to the longitudinal direction of the tube wall and thus in the longitudinal direction of the vehicle. With its other end (analogous to FIG. 1a, FIG. 1c), this tension device 4 is wound onto a reel 5 which can be caused to rotate by an electric motor and which is supported, for example, by way of the electric motor 6 at the vehicle body which is not shown in the figure. By rotating the reel 5, the free end of the tension device 4 between the reel 5 and the second spring element 2 is shortened or lengthened, in which case, because of the fact that the second spring element 2, that is, the tube-shaped torsion bar spring 2, is fastened with its end section to the stabilizer bar 13, a shortening of the free end of the tension device 4 always causes a twisting of the second spring element 2 (=of the tube-shaped torsion bar 2), whereby the latter is tensioned. Inversely, when the second spring element is tensioned at first, a lengthening of the free end of the tension device 4 causes a relaxation of the second spring element 2. The completely relaxed condition of the spring element 2 is illustrated in FIG. 2b, in which the slack (and therefore itself also not tensioned) tension device 4 or its end situated between the spring element 2 and the reel 5 is visible. In contrast, in the condition according to FIG. 2c, this end and therefore the tension device 4 is tensioned, in which case the spring element 2 constructed as a tube-shaped torsion bar spring 2, in comparison to the condition according to FIG. 2b, was twisted by the tension device 4 by approximately 90° in the center, as indicated by differently situated marking 2a.

Figure 2C:
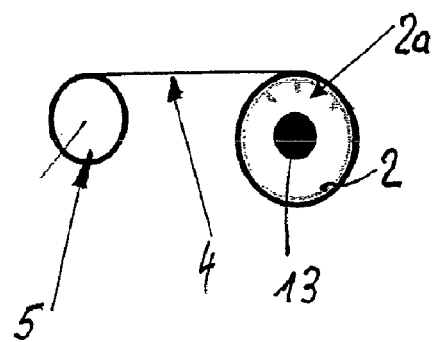

When now the second spring element 2 is tensioned according to the illustration in FIG. 2c, this spring element 2 acts parallel to the above-mentioned first spring elements (1) of the two wheels 12*, 12', since the second spring element 2 is supported in the center quasi with one end by way of the mechanical tensioning element formed by the tension device 4 as well as the reel 5 on the vehicle body (11), and with the left and right end respectively is supported by way of a partial section of the stabilizer bar 13 as well as by way of the respective hinged support 14 and 14 respectively at the respective wheel 12* and 12' respectively (more precisely, on their wheel carriers). Relative to the respective vehicle wheel 12* and 12" respectively, in each case, only half of the tube-shaped torsion bar spring 2 acts as a second spring element 2; that is, the left section of the tube-shaped torsion bar spring 2 extending from the stabilizer bar 13 to the application point of the tension device 4 acts for the left wheel 12*, and in a comparable manner, the right section of the tube-shaped torsion bar spring 2 extending from the stabilizer bar 13 to the application point of the tension device acts for the right wheel 12'.

Since the second spring element 2 in the case of this above-described construction for the left wheel 12* and for the right wheel 12' is formed by a cohesive component, specifically by the above-mentioned tube-shaped torsion bar spring 2, in the not tensioned condition according to FIG. 2b, this tube-shaped torsion spring 2 supports the stabilizer bar 13 in its effect; in contrast, in the tensioned condition (and thus in the case of the tensioned tension device 4 according to FIG. 2c), the torsional stiffness of the torsion bar spring 2 acts by way of the hinged support 14, 14' upon the chassis and in the process pulls the vehicle body (11), for example, downward toward the road, the stabilizer function of the stabilizer bar 13 not being affected thereby.

According to an embodiment (not shown in the figures) that is modified with respect to the above-described embodiment, instead of the one-piece tube-shaped torsion bar spring 2, two mutually separate tube-shaped torsion bar springs may be provided in that, deviating from the described embodiment, a division of the tube-shaped torsion bar spring 2 is provided below the tension device. A respectively separate left half assigned to the left wheel 12* as well as right half assigned to the right wheel 12' will therefore exist, and these two halves of the tube-shaped torsion bar spring (2) are mutually connected virtually only by the band-shaped tension device 4 in its tensioned condition.

Because of the abstracted representation, another conceivable (optional) characteristic is not visible here; specifically that the tube wall of the tube-shaped torsion bar spring 2 has or can have a slotted construction, namely, on the one hand, in order to implement a desired spring rate. This slot can preferably extend diagonally for reducing the occurring tensions. Such a slot which, with the exception of the region of the later fastening points of the tube-shaped torsion bar spring 2 at the stabilizer bar 13, extends along the entire length of the torsion bar spring 2 essentially in the longitudinal direction, may also be used for permitting a mounting of the torsion bar spring 2 on the stabilizer bar 13.

According to another embodiment deviating from the representation of the figures, at least two tension devices (4) can be applied to the tube-shaped torsion bar spring 2 laterally as well as offset with respect to their tensioning direction and particularly in a mutually opposite direction with respect to the torsion, whereby, by means of these tension devices (4), essentially only torsional forces are introduced into this torsion bar spring 2, while its bending stress can thereby be considerably reduced.

Another conceivable embodiment is illustrated in FIGS. 3a, 3b, 3c. Deviating from the embodiment according to FIG. 2a, here the tube-shaped torsion bar spring 2 with its end sections is not fastened directly to the stabilizer bar 13 but, in these regions, one tube-shaped rubber spring element 3 is in each case intermediately connected on the left side as well as on the right side. These tube-shaped rubber spring elements 3, which are clamped at the ends of the tube-shaped torsion bar spring 2 between the latter and the stabilizer bar 13, act as a torsional spring element and thus as another, third spring element which can be connected or deactivated by way of the tension device 4. Deviating from this embodiment, a tube-shaped rubber spring element similar to the tube-shaped torsion bar spring can naturally also act as a second spring element 2 if the tension device 4 (or generally a mechanical tensioning element) is applied directly to the outer wall of this tube-shaped rubber spring element, which is arranged on the stabilizer bar 13. In addition, the bearings of the stabilizer bar 13 on the vehicle body 11 are also illustrated in these FIGS. 3a, 3b, 3c and are marked with the reference number 15.

Furthermore, FIGS. 3b, 3c show a modification of the mechanical tensioning device. The latter, in addition, has a flexible tension device in the form of a wide tension band applied to the second or additional spring element 2. However, this flexible tension device 4 is connected by way of a free-running device 8 ensuring a sufficient free-running characteristic in the relaxed condition with a spindle 9 which can be displaced by means of the servo motor 6. As illustrated in the figures, this free-running device 8 is formed by a longitudinal slot (also reference number 8) provided in the region of the free end of the tension device 4, in which longitudinal slot the free end of the spindle 9 is movably guided such in its possible moving direction by a certain distance that, in the relaxed condition of this tension device 4 according to FIG. 3b, no impairment by the, or limitation of the, rotating movements of the stabilizer bar 13 can occur; that is, that following these movements, the tension device 4 can sufficiently move with respect to the stationary spindle 9. In contrast, in the tensioned condition, which is illustrated in FIG. 3c, this free-running device 8 is functionally blocked in that the free end of the spindle rests against the end stop of the above-mentioned slot 8 and in the process pulls the tension band or tension device 4 in the direction of the servo motor 6.

These two figures also show that the mechanical tensioning element itself, here, the servo motor 6 with the spindle 9, but, as an alternative, also the above-mentioned reel 6 or the like, can be fastened to the vehicle body 11 with the intermediate connection of another spring element 10. This permits an additional tuning or detuning of the stiffness of the entire suspension system, in which case the additional spring element 10, together with the second spring element 2, forms a series connection, and in which case this series connection of the second spring element 2 and the additional spring element 10, in turn, as mentioned above, is connected parallel to the first spring element (1), which is not shown, that is, the bearing springs of the wheels (12*, 12') not shown here.

Another embodiment of the present invention corresponds to the representation of FIG. 3a but, deviating from the above explanation of this figure, the component part with the reference number 2 is no tube-shaped torsion bar spring but an essentially torsion-proof tube which is non-rotatably connected with the two rubber spring elements 3. When the tube is rotated by means of the tension band or tension device 4 about the linear section of the stabilizer bar 13, the two tube-shaped rubber spring elements 3 are thereby twisted, which here act solely as torsional spring elements and, in each case, as a second spring element in accordance with the present invention for the left and right vehicle wheel (12*,12') respectively (not shown in the figures).

In the following, supplements or embodiments will be briefly described which are not limited to one of the embodiments described so far. Thus, a corresponding suspension system according to the invention can be operated on a two-axle vehicle by means of a single servo motor (compare reference number 6 in FIG. 2a) for several mechanical tensioning elements assigned to the individual axles or wheels if, for example, (with reference to the embodiment according to FIG. 2a) a tension device 4 assigned to the vehicle front axle and a tension device 4 assigned to the vehicle rear axle are each guided, for example, into the region of the vehicle center, where this single servo motor 6 for the two reels 5 of the two tension devices 4 can be fastened to the underbody of the vehicle body 11. However, for the purpose of an advantageous combination of functions, deviating from the embodiments according to FIG. 2a and FIG. 3, but by using their basic principle, the stabilizer bar 13 itself may operate as a second spring element 2 if—without providing the explained tube-shaped torsion bar spring (2)—the tension device 4 is applied in a comparable manner directly to the stabilizer bar 13, preferably in the center to its section extending in a straight line between the two bent-away end sections.

It was mentioned above that a suspension system according to the invention may be laid out or designed such that, with the activating of the second spring element 2, the vehicle body 11 is pulled downward toward the road. As a result, because of the second spring element, a harder chassis is advantageously connected with a lowering of the vehicle body. In particular, it may be provided that the driver can individually choose between a hard and a soft chassis, in which case, in addition to the different spring rate switching, a parallel change of the shock absorption characteristics may also be provided by way of differently adjustable adjusting shock absorbers with a view to an optimal design. However, a lowering of the vehicle body can also be used as a loading aid and can especially take place when the trunk lid or the hatch of the vehicle is being opened. The vehicle body can then be raised again with the closing of the lid or hatch. Advantageously, an electric motor, which is provided for opening the hatch, may simultaneously appropriately mechanically be connected with the mechanical tensioning element according to the invention (for example, with the above-mentioned reel 5) such that, with an opening of the rear lid triggered by this motor, a lowering of the vehicle body takes place simultaneously.

As far as the so-called spring rate switching introduced here is concerned, the design may also be opposite to that explained in the preceding paragraph; that is, that a suspension system according to the invention can be utilized for a load compensation in the sense that, with an increasing load, the hereby lowering vehicle body is raised, in which case it should also be pointed out that a large number of additional details can definitely be designed to deviate from the above explanations without leaving the content of the claims.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A suspension system for a vehicle wheel suspension, comprising:
    a first spring element clamped between a vehicle body and a vehicle wheel;
    a second spring element arranged to be clamped between the vehicle body and the vehicle wheel by a mechanical tensioning element, the mechanical tensioning element activating the second spring element by connecting the second spring element in tension in parallel to the first spring element, and deactivating the second spring element by releasing the second spring element from applying tension in parallel to the first spring element; and
    a pressure addition spring element acts as an end stop during large spring excursions of the first spring element,
    wherein the introduction of the force or of the momentum for activating the second spring element does not activate the pressure addition spring element.

2. The suspension system according to claim 1, wherein
a spring rate of the second spring element is lower than a spring rate of the first spring element.

3. The suspension system according to claim 2, wherein
the spring rate of the second spring element is selected such that the active second spring element during a compression of the vehicle body with respect to the wheel remains active at least until the pressure addition spring element is active.

4. The suspension system according to claim 3, wherein
the mechanical tensioning element is a flexible tension device applied to the second spring element and a servo motor arranged to shorten or lengthen the flexible tension device.

5. The suspension system according to claim 4, further comprising:
second spring elements and mechanical tensioning elements, the mechanical tensioning elements having flexible tension devices, assigned to each of different wheels or axles of the vehicle,
wherein the second spring elements are configured to be activated or deactivated by a common servo motor arranged to shorten or lengthen the flexible tension devices.

6. The suspension system according to claim 4, wherein
the flexible tension device is arranged to be at least one of shortened by being wound onto a reel and lengthened by being unwound from the reel.

7. The suspension system according to claim 4, wherein
the flexible tension device is connected with a spindle displaceable by a servo motor by a free-running device ensures a sufficient free-running characteristic in a relaxed condition.

8. The suspension system according to claim 4, wherein
the flexible tension device is elastic and is configured to act as an additional spring element.

9. The suspension system according to claim 4, wherein
the mechanical tensioning device is fastened to the vehicle body by an intermediate connection of another spring element.

* * * * *